United States Patent
Gu et al.

(10) Patent No.: US 10,445,864 B2
(45) Date of Patent: Oct. 15, 2019

(54) DPI ADAPTATION METHOD AND ELECTRONIC DEVICE

(71) Applicant: Huawei Technologies Co., Ltd., Shenzhen (CN)

(72) Inventors: Zhili Gu, Wuhan (CN); Geng Liu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 54 days.

(21) Appl. No.: 15/553,776

(22) PCT Filed: Feb. 26, 2015

(86) PCT No.: PCT/CN2015/073283
§ 371 (c)(1),
(2) Date: Aug. 25, 2017

(87) PCT Pub. No.: WO2016/134499
PCT Pub. Date: Sep. 1, 2016

(65) Prior Publication Data
US 2018/0047143 A1    Feb. 15, 2018

(51) Int. Cl.
*G06T 5/00* (2006.01)
*G06F 3/14* (2006.01)
(Continued)

(52) U.S. Cl.
CPC .............. *G06T 5/009* (2013.01); *G06F 3/048* (2013.01); *G06F 3/14* (2013.01); *G06T 11/00* (2013.01); *G09G 2340/0407* (2013.01)

(58) Field of Classification Search
CPC ......... G06T 17/20; G06T 15/00; G06T 15/04; G06T 2210/36; G09G 5/391; G09G 2340/0407; G09G 5/006; G09G 2340/0421; G09G 2340/0414; G09G 2360/02; G09G 2370/042; G09G 5/005
See application file for complete search history.

(56) References Cited

U.S. PATENT DOCUMENTS 7,689,908 B2 * 3/2010 Yan ........................... G06F 8/38
715/238
2003/0174145 A1    9/2003 Lyapunov et al.
(Continued)

FOREIGN PATENT DOCUMENTS

CN    102129338 A    7/2011
CN    103197833 A    7/2013
(Continued)

*Primary Examiner* — Todd Buttram
(74) *Attorney, Agent, or Firm* — Slater Matsil, LLP

(57) ABSTRACT

A DPI adaptation method and an electronic device are provided. The DPI adaptation method includes: obtaining dots per inch DPI of the electronic device and DPI supported by an application, where the DPI of the electronic device includes at least one of logical DPI of the electronic device or physical DPI of the electronic device; determining a general display type of the electronic device, where the general display type is a most-used display type of the electronic device; determining target DPI according to the DPI of the electronic device, the DPI supported by the application, and the general display type; and displaying a user interface of the application by using the target DPI.

19 Claims, 6 Drawing Sheets

(51) Int. Cl.
*G06F 3/048* (2013.01)
*G06T 11/00* (2006.01)

(56) References Cited

U.S. PATENT DOCUMENTS

| | | | |
|---|---|---|---|
| 2005/0190203 A1 | 9/2005 | Gery et al. | |
| 2007/0132787 A1 | 6/2007 | Ko | |
| 2008/0115055 A1* | 5/2008 | Sadovsky | G06F 17/2264 |
| | | | 715/255 |
| 2011/0216064 A1 | 9/2011 | Dahl et al. | |
| 2012/0274656 A1 | 11/2012 | Kang et al. | |
| 2013/0176345 A1* | 7/2013 | Kim | G06T 3/40 |
| | | | 345/666 |
| 2013/0312022 A1* | 11/2013 | Yoon | H04N 21/25891 |
| | | | 725/14 |
| 2014/0055497 A1* | 2/2014 | Sohn | H04N 21/6582 |
| | | | 345/660 |
| 2015/0009217 A1* | 1/2015 | Yamamoto | G06T 3/40 |
| | | | 345/428 |
| 2015/0326896 A1* | 11/2015 | Su | H04N 19/46 |
| | | | 375/240.26 |
| 2016/0071243 A1* | 3/2016 | Kim | G06T 5/001 |
| | | | 382/305 |

FOREIGN PATENT DOCUMENTS

| | | |
|---|---|---|
| CN | 104035664 A | 9/2014 |
| JP | H1049336 A | 2/1998 |
| JP | 2001159967 A | 6/2001 |
| KR | 20060043268 A | 5/2006 |
| KR | 20110058879 A | 6/2011 |
| RU | 2312404 C2 | 12/2007 |
| WO | 2012148087 A2 | 11/2012 |
| WO | 2014200543 A1 | 12/2014 |

* cited by examiner

DPI ADAPTATION METHOD AND ELECTRONIC DEVICE

CROSS-REFERENCE TO RELATED APPLICATIONS

This application is a US National Stage application of International Application No. PCT/CN2015/073283, filed on Feb. 26, 2015, which application is hereby incorporated herein by reference.

TECHNICAL FIELD

The present invention relates to the field of computer technologies, and in particular, to a DPI (Dots Per Inch) adaptation method and an electronic device.

BACKGROUND

Various screen sizes of electronic devices result in various types of logical DPI of the electronic devices. However, a screen size and logical DPI of one electronic device are fixed. Because a third-party application (such as an application Facebook) may be installed on electronic devices having screens of different sizes, the third-party application needs to support multiple types of DPI, and a value range of the multiple types of DPI needs to include multiple types of logical DPI of different electronic devices.

Although the third-party application supports multiple types of DPI, when a user interface of the third-party application is displayed on an electronic device, DPI is usually read from a system read-only memory (Read-Only Memory, ROM), and the DPI stored in the system ROM is logical DPI. Therefore, the user interface of the third-party application is usually displayed on the electronic device by using only the logical DPI. In this way, data displayed on a screen is excessively large or excessively small for different users, and user experience is affected.

Currently, a user interface of a third-party application may be displayed on an electronic device in a user-defined adaptation mode by using DPI set by a user. However, automatic DPI adaptation cannot be implemented by using this method, and user experience deteriorates.

SUMMARY

Embodiments of the present invention provide a DPI adaptation method and an electronic device, so as to implement an automatic DPI adaptation function and enhance user experience.

To achieve the foregoing objectives, the following technical solutions are used in the embodiments of the present invention.

According to a first aspect, a DPI adaptation method is provided and applied to an electronic device, where at least one application is installed on the electronic device. The method includes obtaining dots per inch DPI of the electronic device and DPI supported by the application, where the DPI of the electronic device includes at least one of logical DPI of the electronic device or physical DPI of the electronic device. The method also includes determining a general display type of the electronic device, where the general display type is a most-used display type of the electronic device. The method also includes determining target DPI according to the DPI of the electronic device, the DPI supported by the application, and the general display type. The method also includes displaying a user interface of the application by using the target DPI.

With reference to the first aspect, in a first possible implementation manner, the obtaining DPI supported by the application includes: obtaining, from an installation package of the application, the DPI supported by the application; or obtaining, from a preset DPI list, the DPI supported by the application.

With reference to the first aspect, in a second possible implementation manner, the determining target DPI according to the DPI of the electronic device, the DPI supported by the application, and the general display type includes: determining, according to the DPI of the electronic device, the DPI supported by the application, and a quantity of display types of the electronic device, to-be-selected DPI supported by the application; and determining, according to a display type of the electronic device and the to-be-selected DPI supported by the application, target DPI corresponding to the general display type.

With reference to the second possible implementation manner of the first aspect, in a third possible implementation manner, the determining, according to a display type of the electronic device and the to-be-selected DPI supported by the application, target DPI corresponding to the general display type includes: determining a correspondence between the display type of the electronic device and the to-be-selected DPI supported by the application; and determining, according to the correspondence, the target DPI corresponding to the general display type.

With reference to any one of the first aspect, or the first to the third possible implementation manners of the first aspect, in a fourth possible implementation manner, after the determining target DPI, the method further includes: recording the target DPI.

With reference to any one of the first aspect, or the first to the fourth possible implementation manners of the first aspect, in a fifth possible implementation manner, the determining a general display type of the electronic device includes: determining the general display type of the electronic device according to a historical display-type usage record stored in the electronic device.

According to a second aspect, an electronic device is provided, where at least one application is installed on the electronic device. The electronic device includes an obtaining unit, configured to obtain dots per inch DPI of the electronic device and DPI supported by the application, where the DPI of the electronic device includes at least one of logical DPI of the electronic device or physical DPI of the electronic device. The electronic device also includes a first determining unit, configured to determine a general display type of the electronic device, where the general display type is a most-used display type of the electronic device. The electronic device also includes a second determining unit, configured to determine target DPI according to the DPI of the electronic device, the DPI supported by the application, and the general display type. The electronic device also includes a display unit, configured to display a user interface of the application by using the target DPI.

With reference to the second aspect, in a first possible implementation manner, the obtaining unit is specifically configured to: obtain, from an installation package of the application, the DPI supported by the application; or obtain, from a preset DPI list, the DPI supported by the application.

With reference to the second aspect, in a second possible implementation manner, the second determining unit is specifically configured to: determine, according to the DPI of the electronic device, the DPI supported by the application, and a quantity of display types of the electronic device, to-be-selected DPI supported by the application; and determine, according to a display type of the electronic device and the to-be-selected DPI supported by the application, target DPI corresponding to the general display type.

With reference to the second possible implementation manner of the second aspect, in a third possible implementation manner, the second determining unit is specifically configured to: determine a correspondence between the display type of the electronic device and the to-be-selected DPI supported by the application; and determine, according to the correspondence, the target DPI corresponding to the general display type.

With reference to any one of the second aspect, or the first to the third possible implementation manners of the second aspect, in a fourth possible implementation manner, the electronic device further includes: a record unit, configured to record the target DPI.

With reference to any one of the second aspect, or the first to the fourth possible implementation manners of the second aspect, in a fifth possible implementation manner, the first determining unit is specifically configured to determine the general display type of the electronic device according to a historical display-type usage record stored in the electronic device.

According to a third aspect, an electronic device is provided, where at least one application is installed on the electronic device, and the electronic device includes a memory, a processor, and a display. The memory is configured to store a group of executable code, and the executable code is used to control the processor to execute the following actions: obtaining dots per inch DPI of the electronic device and DPI supported by the application, where the DPI of the electronic device includes at least one of logical DPI of the electronic device or physical DPI of the electronic device; determining a general display type of the electronic device, where the general display type is a most-used display type of the electronic device; and determining target DPI according to the DPI of the electronic device, the DPI supported by the application, and the general display type; and the display is configured to display a user interface of the application by using the target DPI.

With reference to the third aspect, in a first possible implementation manner, the processor is specifically configured to: obtain, from an installation package of the application, the DPI supported by the application; or obtain, from a preset DPI list, the DPI supported by the application.

With reference to the third aspect, in a second possible implementation manner, the processor is specifically configured to: determine, according to the DPI of the electronic device, the DPI supported by the application, and a quantity of display types of the electronic device, to-be-selected DPI supported by the application; and determine, according to a display type of the electronic device and the to-be-selected DPI supported by the application, target DPI corresponding to the general display type.

With reference to the second possible implementation manner of the third aspect, in a third possible implementation manner, the processor is specifically configured to: determine a correspondence between the display type of the electronic device and the to-be-selected DPI supported by the application; and determine, according to the correspondence, the target DPI corresponding to the general display type.

With reference to any one of the third aspect, or the first to the third possible implementation manners of the third aspect, in a fourth possible implementation manner, the memory is further configured to record the target DPI.

With reference to any one of the third aspect, or the first to the fourth possible implementation manners of the third aspect, in a fifth possible implementation manner, the processor is specifically configured to determine the general display type of the electronic device according to a historical display-type usage record stored in the electronic device.

According to the DPI adaptation method and the electronic device that are provided in the embodiments of the present invention, target DPI is obtained according to DPI of the electronic device, DPI supported by an application, and a general display type of the electronic device, and a user interface of the application is displayed by using the target DPI, thereby implementing automatic DPI adaptation. On one hand, a parameter being the DPI supported by the application is considered in this solution, so that the electronic device no longer uses only logical DPI to display the user interface of the application. On the other hand, in comparison with the prior art in which DPI adaptation is performed in a user-defined adaptation mode, user experience can be enhanced.

According to a fourth aspect, a DPI adaptation method is provided and applied to an electronic device, where at least one application is installed on the electronic device. The method includes obtaining a whitelist, where the whitelist includes a correspondence between a specific application identifier and dots per inch DPI. The method also includes using DPI corresponding to an identifier of the application as target DPI if the whitelist includes the identifier of the application, or using logical DPI of the electronic device as target DPI if the whitelist does not include an identifier of the application. The method also includes displaying a user interface of the application by using the target DPI.

According to a fifth aspect, an electronic device is provided, where at least one application is installed on the electronic device. The electronic device includes an obtaining unit, configured to obtain a whitelist, where the whitelist includes a correspondence between a specific application identifier and dots per inch DPI. The method also includes a determining unit, configured to use DPI corresponding to an identifier of the application as target DPI if the whitelist includes the identifier of the application, or use logical DPI of the electronic device as target DPI if the whitelist does not include an identifier of the application. The method also includes a display unit, configured to display a user interface of the application by using the target DPI.

According to a sixth aspect, an electronic device is provided, where at least one application is installed on the electronic device, and the electronic device includes a memory, a processor, and a display. The memory is configured to store a group of executable code, and the executable code is used to control the processor to execute the following actions: obtaining a whitelist, where the whitelist includes a correspondence between a specific application identifier and dots per inch DPI; and using DPI corresponding to an identifier of the application as target DPI if the whitelist includes the identifier of the application, or using logical DPI of the electronic device as target DPI if the whitelist does not include an identifier of the application; and the display is configured to display a user interface of the application by using the target DPI.

According to the DPI adaptation method and the electronic device that are provided in the embodiments of the present invention, target DPI is obtained by determining whether an application is included in a whitelist, and a user interface of the application is displayed by using the target DPI, thereby implementing automatic DPI adaptation. In comparison with the prior art in which DPI adaptation is performed in a user-defined adaptation mode, user experience can be enhanced.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Some terms in this application are first explained to facilitate understanding by a person skilled in the art.

Physical DPI, also referred to as PPI (Pixels Per Inch), indicates a quantity of pixels (pixel) in each inch, and is determined according to a size and resolution of a screen of an electronic device. An electronic device has only one type of physical DPI. Physical DPI of different electronic devices may be the same, or may be different.

Logical DPI may also be referred to as system DPI, and a value range of the logical DPI is a series of preset values. Logical DPI of an electronic device is related to physical DPI of the electronic device, and is specifically a preset value that is in the series of preset values and that is closest to the physical DPI of the electronic device. An electronic device has only one type of logical DPI. Logical DPI of different electronic devices may be the same, or may be different. Logical DPI and physical DPI for a same electronic device may be the same, or may be different.

DPI supported by an application: An application may support one or more types of DPI. One type of DPI supported by an application may be the same as physical DPI and/or logical DPI of an electronic device in which the application is located. All types of DPI supported by an application may be different from physical DPI and logical DPI of an electronic device in which the application is located.

"Multiple" refers to two or more than two.

Figure 1:
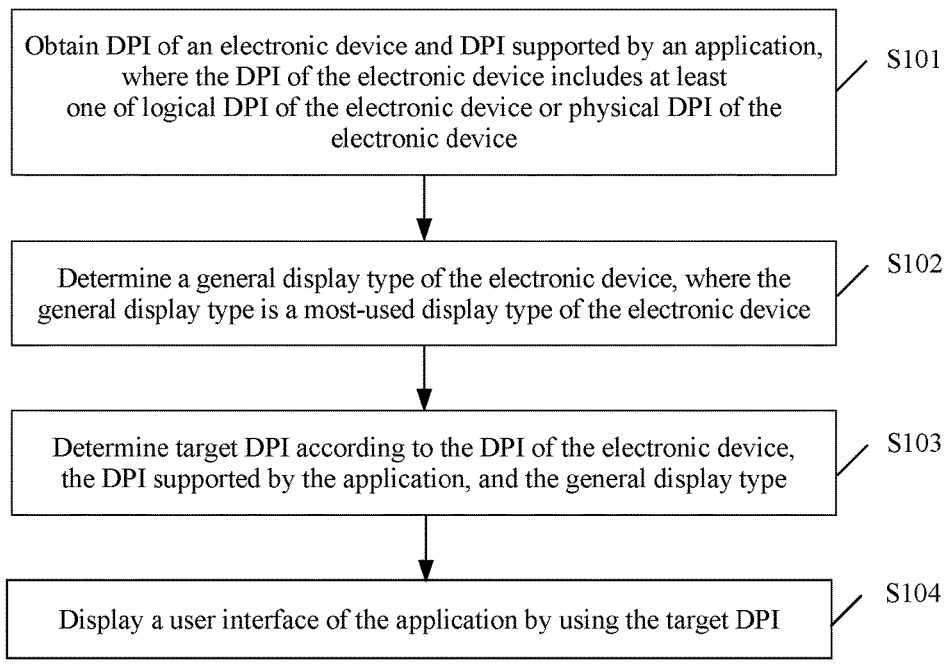
FIG. 1 is a schematic flowchart of a DPI adaptation method according to an embodiment of the present invention.

As shown in FIG. 1, an embodiment of the present invention provides a DPI adaptation method applied to an electronic device. At least one application is installed on the electronic device, and the method includes the following steps.

S101. Obtain DPI of the electronic device and DPI supported by the application, where the DPI of the electronic device includes at least one of logical DPI of the electronic device or physical DPI of the electronic device.

The "electronic device" is an electronic device in which a third-party application program (APP) can be installed, and may be a smartphone, a tablet computer, a personal digital assistant (PDA), or the like. A type of an operating system installed on the electronic device is not limited in this embodiment of the present invention, and may be an Android system, a Symbian system, or the like.

The "application" refers to any one or more of third-party applications installed on the electronic device, such as an application Facebook. In this embodiment of the present invention, a user may perform DPI adaptation on all the third-party applications installed on the electronic device, or may perform DPI adaptation on some of the third-party applications installed on the electronic device. In addition, for example, the electronic device is a smartphone. In specific implementation, a user may select some or all of third-party applications that are installed on the smartphone and that are displayed by using a "settings" function of the smartphone, and perform DPI adaptation on these third-party applications.

The electronic device may directly read the physical DPI and the logical DPI from a storage unit of the electronic device.

The electronic device may obtain, from an installation package of the application or a preset DPI list, the DPI supported by the application. That the electronic device obtains, from the installation package of the application, the DPI supported by the application may include: parsing the installation package of the application to obtain a parsing result; and enumerating structures of "layout" and "draw" that are in a "res" directory in the parsing result, to obtain the DPI supported by the application. The "preset DPI list" may be DPI supported by some common applications. The preset DPI list may be stored in the electronic device before delivery of the electronic device, or may be entered into the electronic device by a user, or may be filled out when the application is installed.

It should be noted that S101 may include: obtaining, when the application is enabled, the DPI of the electronic device and the DPI supported by the application. Preferably, the DPI of the electronic device and the DPI supported by the application are obtained when the application is enabled for the first time.

S102. Determine a general display type of the electronic device, where the general display type is a most-used display type of the electronic device.

"Display types of the electronic device" may be classified according to an actual requirement. This is not limited in this embodiment of the present invention. For example, a classification method may include three types: relatively large, moderate, and relatively small; another classification method may include five types: extremely large, relatively large, moderate, relatively small, and extremely small; and the like.

The "general display type of the electronic device" may be a display type that is of the electronic device and that has a largest quantity of usage times, or highest usage frequency, or longest usage time. The electronic device may determine the general display type of the electronic device according to a historical display-type usage record stored in the electronic device. The electronic device may obtain the historical display-type usage record by recording information of each display type indicated by a user. The "historical display-type usage record" may be a quantity of historical usage times, historical usage time, or the like for each display type. The "historical usage record" may remain incrementally updated after an application is enabled in the electronic device for the first time, or may be reset and incrementally updated again after a trigger condition is met. The trigger condition may be a preset time segment, or may be an indication message of a user, or the like.

Specifically, that the electronic device determines the general display type of the electronic device according to the historical display-type usage record stored in the electronic device may be implemented in the following manners 1 and 2:

Manner 1: A quantity of historical usage times of each display type of the electronic device is obtained, and a display type that has a largest quantity of historical usage times is used as the general display type. For example, a counter corresponding to each display type may be set in the electronic device. When an indication message for a display type is received from a user, a counter corresponding to the display type is increased by 1. A quantity of historical usage times of each display type is obtained by reading a value on the counter corresponding to each display type. When multiple display types have the largest quantity of historical usage times, any one of the multiple display types may be selected as the general display type.

Manner 2: Historical usage time of each display type of the electronic device is obtained, and a display type that has longest historical usage time is used as the general display type. For example, the electronic device may record total time for displaying a user interface of an application by using each display type as the historical usage time. When multiple display types have the longest historical usage time, any one of the multiple display types is selected as the general display type.

It should be noted that the foregoing manners 1 and 2 may be separately used, or may be used together, or may be used in combination with another manner. The manners 1 and 2 are used together in the following example: A quantity of historical usage times of each display type of the electronic device by a user is obtained. When multiple display types have a largest quantity of historical usage times, historical usage time of the multiple display types is obtained. A display type that has longest historical usage time is used as the general display type. Certainly, there may be other combination manners that are not enumerated herein.

In addition, it should be noted that S102 may be applicable to a scenario in which a historical record for using any one or more display types of DPI of an application by a user exists. In specific implementation, when DPI adaptation is performed on the application for the first time, a historical record for using any display type of DPI of the application by a user does not exist. In this case, a default display type may be used as the general display type. A display type accepted by most users is recommended as the default display type. For example, in the foregoing enumerated display type classification manners, "moderate" may be usually selected for the default display type. Optionally, the default display type may be set in the storage unit of the electronic device at delivery of the electronic device.

S103. Determine target DPI according to the DPI of the electronic device, the DPI supported by the application, and the general display type.

Optionally, S103 may include the following steps:

Step A: Determine, according to the DPI of the electronic device, the DPI supported by the application, and a quantity of display types of the electronic device, to-be-selected DPI supported by the application. Optionally, a quantity of to-be-selected DPI supported by the application is the same as the quantity of display types of the electronic device.

Step B: Determine, according to a display type of the electronic device and the to-be-selected DPI supported by the application, target DPI corresponding to the general display type.

For example, step A may include: obtaining reference DPI according to the DPI of the electronic device and the DPI supported by the application; and selecting, according to the reference DPI, N types of DPI from the DPI supported by the application. N is the quantity of display types of the electronic device, N is an integer greater than or equal to 1, and a difference between each of the N types of DPI and the reference DPI is less than a difference between the reference DPI and a type of DPI other than the N types of DPI in the DPI supported by the application. For a specific example of this implementation manner, reference may be made to the following embodiment. Optionally, the electronic device may determine the reference DPI in any one of the following manners:

1). The physical DPI is used as the reference DPI when one type of the DPI supported by the application is equal to the physical DPI.

2). The logical DPI is used as the reference DPI when none of the DPI supported by the application is equal to the physical DPI, and one type of the DPI supported by the application is equal to the logical DPI.

3). When none of the DPI supported by the application is equal to the physical DPI or the logical DPI, a type of DPI that is in the DPI supported by the application and that is closest to and greater than the physical DPI is used as the reference DPI; or a type of DPI that is in the DPI supported by the application and that is closest to and less than the physical DPI is used as the reference DPI.

For example, step B may include: determining a correspondence between the display type of the electronic device and the to-be-selected DPI supported by the application; and determining, according to the correspondence, the target DPI corresponding to the general display type. For example, when display types are "relatively large, moderate, and relatively small", and the to-be-selected DPI supported by the application is "480 dpi, 400 dpi, and 320 dpi", the following three correspondences may be established: "relatively large" corresponding to 480 dpi, "moderate" corresponding to 400 dpi, and "relatively small" corresponding to 320 dpi. In this way, when the general display type is "moderate", the target DPI is 400 dpi.

The "correspondences" may be presented in any form such as a table or a sequence. The correspondences are presented in a table (specifically referred to as a "configuration table") in the following example. In this optional implementation manner, the correspondences may be fixed after being determined, or may be updated with an application upgrade (specifically refer to update of the DPI supported by the application). Therefore, in specific implementation, the electronic device may save the correspondences, and directly use the correspondences when the DPI supported by the application has not been updated and the target DPI is not determined for the first time. In this way, time for determining the target DPI can be reduced.

Optionally, after S103, the method may further include recording the target DPI. In this optional implementation manner, when the application is enabled again, the target DPI may be directly used to display a user interface of the application.

S104. Display a user interface of the application by using the target DPI.

S104 may be understood as follows: DPI used to display the user interface of the application on a screen of the electronic device is the target DPI. In the prior art, DPI used to display a user interface on a screen of an electronic device is logical DPI or DPI indicated by a user.

According to the DPI adaptation method provided in this embodiment of the present invention, target DPI is obtained according to DPI of an electronic device, DPI supported by an application, and a general display type of the electronic device, and a user interface of the application is displayed by using the target DPI, thereby implementing automatic DPI adaptation. On one hand, a parameter being the DPI supported by the application is considered in this solution, so that the electronic device no longer uses only logical DPI to display the user interface of the application. On the other hand, in comparison with the prior art in which DPI adaptation is performed in a user-defined adaptation mode, user experience can be enhanced.

Figure 2A:
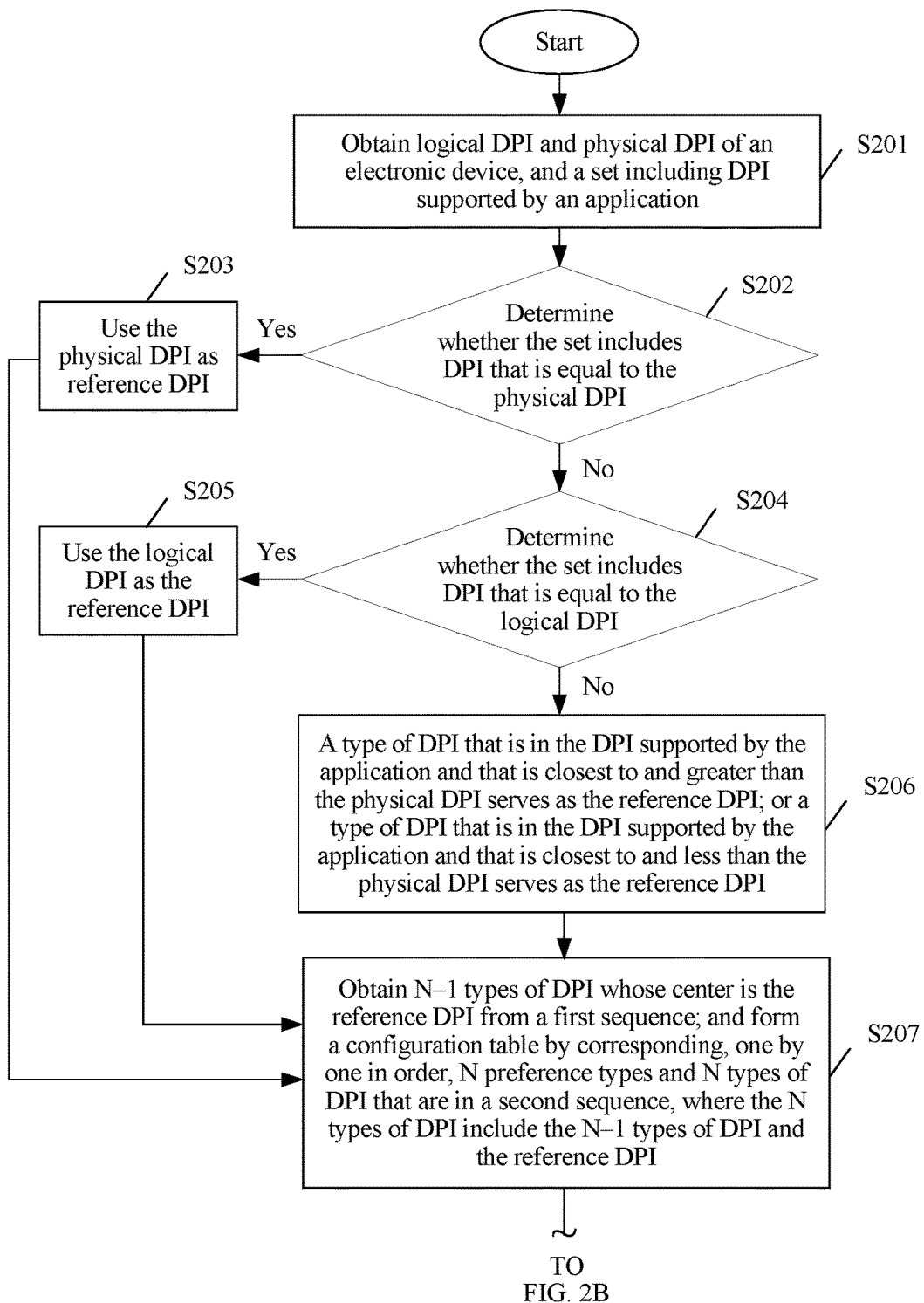
FIG. 2A and FIG. 2B are a schematic flowchart of another DPI adaptation method according to an embodiment of the present invention.
Figure 2B:
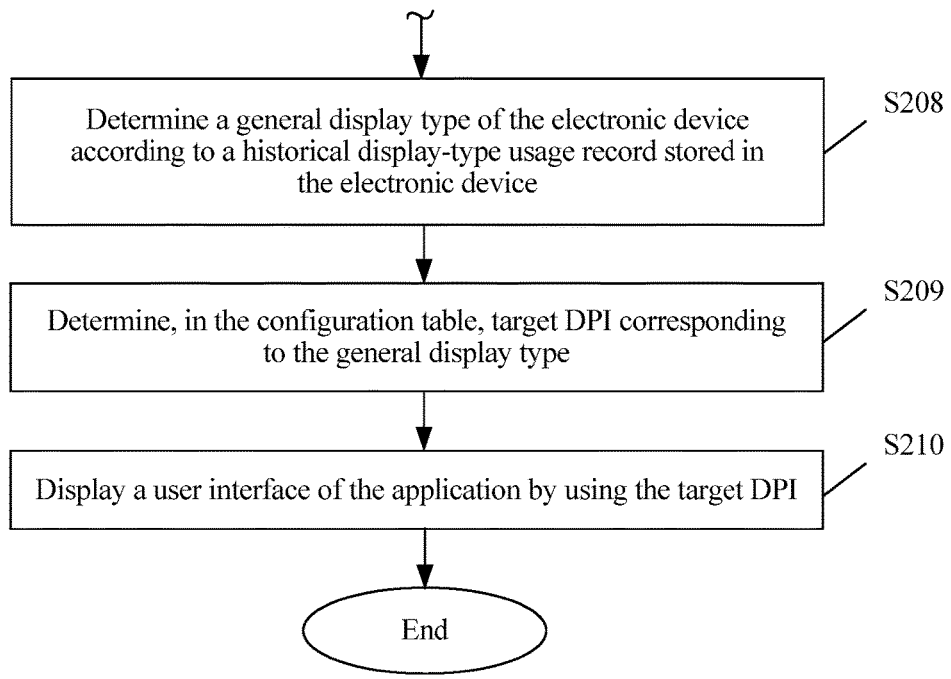

As shown in FIG. 2A and FIG. 2B, another DPI adaptation method provided in an embodiment of the present invention includes the following steps.

S201. Obtain logical DPI and physical DPI of an electronic device, and a set including DPI supported by an application.

For example, the physical DPI and the logical DPI obtained after the electronic device executes S201 are shown in table 1, and the set of the DPI supported by the application is shown in table 2.

TABLE 1

| Physical DPI | Logical DPI |
| --- | --- |
| 320 dpi | 400 dpi |

TABLE 2

| Application | Set including DPI supported by an application |
| --- | --- |
| Application 1 | Set 1: 320 dpi, 400 dpi, and 480 dpi |
| Application 2 | Set 2: 240 dpi, 320 dpi, and 400 dpi |
| Application 3 | Set 3: 120 dpi, 240 dpi, and 320 dpi |
| Application 4 | Set 4: 400 dpi, 480 dpi, and 640 dpi |

TABLE 2-continued

| Application | Set including DPI supported by an application |
| --- | --- |
| Application 5 | Set 5: 240 dpi, 400 dpi, and 480 dpi |
| Application 6 | Set 6: 240 dpi, 480 dpi, and 640 dpi |

S202. Determine whether the set includes DPI that is equal to the physical DPI.

If yes, perform S203; if no, perform S204.

Based on the example shown in tables 1 and 2, the sets 1, 2, and 3 including the DPI supported by the applications 1, 2, and 3 include DPI that is equal to the physical DPI (320 dpi). The sets including the DPI corresponding to the remaining applications (applications 4, 5, and 6) do not include DPI that is equal to the physical DPI.

S203. Use the physical DPI as reference DPI.

Perform S207 after S203 is performed.

Based on the example in S202, for the applications 1, 2, and 3, the reference DPI is the physical DPI (320 dpi).

S204. Determine whether the set includes DPI that is equal to the logical DPI.

If yes, perform step S205; if no, perform S206.

Based on the example shown in tables 1 and 2, the sets 4 and 5 including the DPI supported by the applications 4 and 5 include DPI that is equal to the logical DPI. The set including the DPI corresponding to the remaining application (that is, application 6) does not include DPI that is equal to the logical DPI.

S205. Use the logical DPI as the reference DPI.

Perform S207 after S205 is performed.

Based on the example in S204, for the applications 4 and 5, the reference DPI is the logical DPI (400 dpi).

S206. A type of DPI that is in the DPI supported by the application and that is closest to and greater than the physical DPI serves as the reference DPI; or a type of DPI that is in the DPI supported by the application and that is closest to and less than the physical DPI serves as the reference DPI.

Based on the example shown in table 1 and table 2, for the application 6, the reference DPI may be 240 dpi or 480 dpi.

S207. Obtain N−1 types of DPI whose center is the reference DPI from a first sequence; and form a configuration table by corresponding, one by one in order, N display types and N types of DPI that are in a second sequence, where the N types of DPI include the N−1 types of DPI and the reference DPI.

The first sequence is a sequence obtained after the DPI supported by the applications is sorted according to size. N indicates a quantity of display types, and N is an integer greater than or equal to 1. When a quantity m of types of DPI in a target direction of the reference DPI in the first sequence is less than a rated quantity M, the remaining M-m types of DPI in the target direction is replaced by the last type of DPI in the target direction. The target direction is a direction in which DPI is increasing or a direction in which DPI is decreasing.

The second sequence is a sequence obtained after the N display types are sorted in order of sizes of corresponding DPI of the display types, and the "order of size" in the second sequence is the same as the "order of size" in the first sequence.

For example, when N is an odd number, M=(N−1)/2. When N is an even number, in one direction of the reference DPI, M=(N−1)/2+1, and in another direction, M=(N−1)/2−1. When the "one direction" is a direction in which DPI is increasing, the "another direction" is a direction in which DPI is decreasing. When the "one direction" is a direction in which DPI is decreasing, the "another direction" is a direction in which DPI is increasing.

For example, in this embodiment, display types of DPI of an user application have three types: "relatively large, moderate, and relatively small". Therefore, in this embodiment, N=3. The "order of size" may be a descending order, or an ascending order.

When the "order of size" in the second sequence is a descending order, the second sequence is: relatively large, moderate, and relatively small. When the "order of size" in the second sequence is an ascending order, the second sequence is: relatively small, moderate, and relatively large.

An order of DPI in each set (that is, the first sequence) in table 2 is an ascending order.

Based on the example shown in table 1 and table 2, after S207 is performed, in the configuration table, an obtained correspondence between display types of the applications 1 to 6 and DPI is shown in table 3.

TABLE 3

| Application | Relatively small | Moderate | Relatively large |
|---|---|---|---|
| Application 1 | null | 320 dpi | 400 dpi |
| Application 2 | 240 dpi | 320 dpi | 400 dpi |
| Application 3 | 240 dpi | 320 dpi | null |
| Application 4 | null | 400 dpi | 480 dpi |
| Application 5 | 240 dpi | 400 dpi | 480 dpi |
| Application 6 | null | 240 dpi | 480 dpi |
| Application 6 | 240 dpi | 480 dpi | 640 dpi |

The "null" indicates the last type of DPI in the target direction when the quantity m of types of DPI in the target direction of the reference DPI in the first sequence is less than the rated quantity M. For example, for the application 1, the "null" indicates the last type of DPI in a decreasing direction of the 320 dpi in the set 1, and is specifically 320 dpi. For the application 3, the "null" indicates the last type of DPI in an increasing direction of the 320 dpi in the set 3, and is specifically 320 dpi. For the application 4, the "null" is specifically 400 dpi. For the application 6 (reference DPI is 240 dpi), the "null" is specifically 240 dpi.

It should be noted that, in table 3, for the applications 2, 5, and 6 (reference DPI is 480 dpi), a quantity m of types of DPI in a target direction of the reference DPI in the first sequence (corresponding to the sets 2, 5, and 6 respectively) is equal to the rated quantity M. For the applications 1, 4, and 6 (reference DPI is 240 dpi), a quantity m of types of DPI in a decreasing direction of the reference DPI in the first sequence (corresponding to the sets 1, 4, and 6 respectively) is less than the rated quantity M. For the application 3, a quantity m of types of DPI in an increasing direction of the reference DPI in the first sequence (corresponding to the set 3) is less than the rated quantity M.

S208. Determine a general display type of the electronic device according to a historical display-type usage record stored in the electronic device.

For a specific implementation manner of S208, reference may be made to the foregoing embodiment.

S209. Determine, in the configuration table, target DPI corresponding to the general display type.

Based on the example shown in table 3, for example, the application 5 is enabled. If the general display type determined in S208 is "relatively large", the target DPI obtained after S209 is performed is 480 dpi. If the general display type determined in S208 is "moderate", the target DPI obtained after S209 is performed is 400 dpi. If the general display type determined in S208 is "relatively small", the target DPI obtained after S209 is performed is 240 dpi.

S210. Display a user interface of the application by using the target DPI.

After S210 is performed, the process ends.

According to the DPI adaptation method provided in this embodiment of the present invention, target DPI is obtained according to DPI of an electronic device, DPI supported by an application, and a general display type of the electronic device, and a user interface of the application is displayed by using the target DPI, thereby implementing automatic DPI adaptation. On one hand, a parameter being the DPI supported by the application is considered in this solution, so that the electronic device no longer uses only logical DPI to display the user interface of the application. On the other hand, in comparison with the prior art in which DPI adaptation is performed in a user-defined adaptation mode, user experience can be enhanced.

Figure 3:
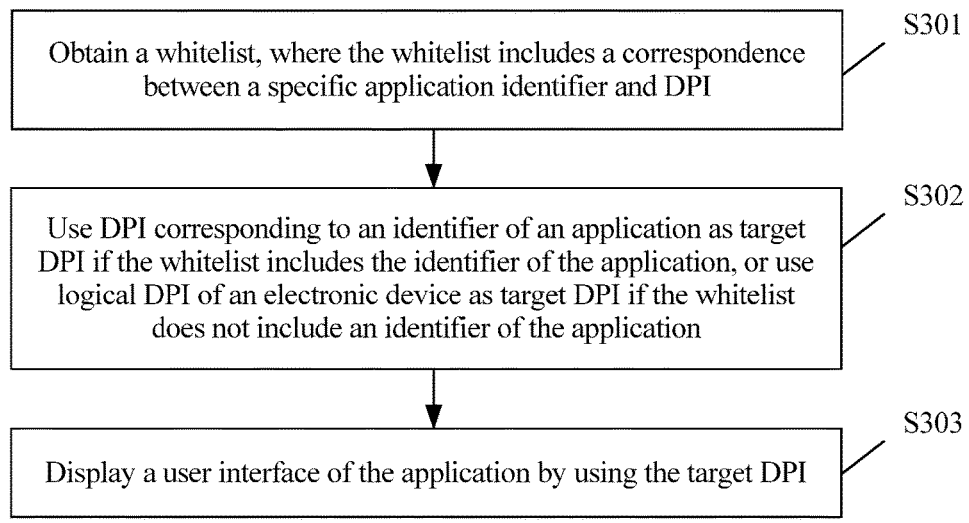
FIG. 3 is a schematic flowchart of another DPI adaptation method according to an embodiment of the present invention.

As shown in FIG. 3, an embodiment of the present invention provides another DPI adaptation method applied to an electronic device. At least one application is installed on the electronic device, and the method includes the following steps.

S301. Obtain a whitelist, where the whitelist includes a correspondence between a specific application identifier and DPI.

For example, the "whitelist" is set before delivery of the electronic device, and is stored in a storage unit of the electronic device. The whitelist includes the correspondence between a specific application identifier and DPI.

A specific application corresponding to the specific application identifier included in the whitelist is an application frequently used by a user, and is also referred to as a common application. The "user" herein refers to a user in generic term, that is, the public or most users. The specific application may be an application determined by a manufacturer according to information such as experience of most users before delivery of the electronic device.

The DPI included in the whitelist is DPI matched with each display type of DPI of a common application by the public. The DPI included in the whitelist may be one or more types of the following DPI: physical DPI, logical DPI, and DPI supported by the application.

It should be noted that any application installed on the electronic device may be the specific application corresponding to the specific application identifier included in the whitelist, or may not be the specific application corresponding to the specific application identifier included in the whitelist.

Optionally, S301 may include: obtaining the whitelist when the application is enabled.

S302. Use DPI corresponding to an identifier of the application as target DPI if the whitelist includes the identifier of the application, or use logical DPI of the electronic device as target DPI if the whitelist does not include an identifier of the application.

S303. Display a user interface of the application by using the target DPI.

S303 may be understood as follows: DPI used to display the user interface of the application on a screen of the electronic device is the target DPI. In the prior art, DPI used to display a user interface on a screen of an electronic device is logical DPI or DPI indicated by a user.

According to the DPI adaptation method provided in this embodiment of the present invention, target DPI is obtained by determining whether an application is included in a whitelist, and a user interface of the application is displayed by using the target DPI, thereby implementing automatic DPI adaptation. In comparison with the prior art in which DPI adaptation is performed in a user-defined adaptation mode, user experience can be enhanced.

It should be noted that, in specific implementation, the DPI adaptation method shown in FIG. 1 or FIG. 2A and FIG. 2B may be used together with the DPI adaptation method shown in FIG. 3, or may be separately used.

Figure 4:
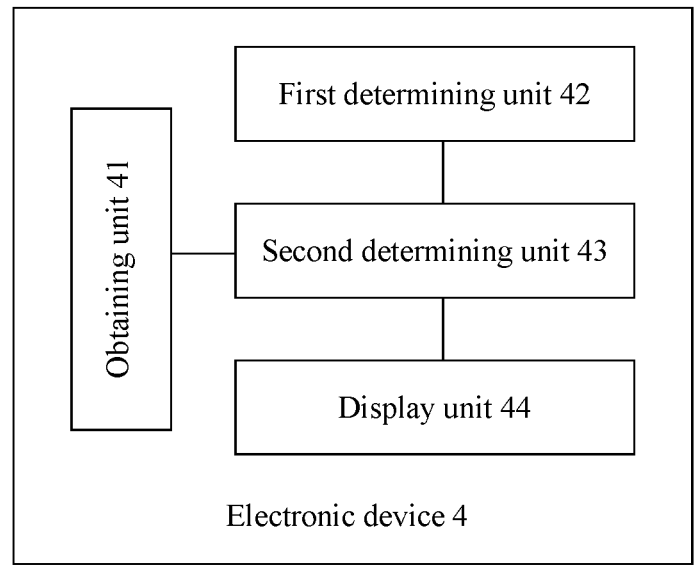
FIG. 4 is a schematic structural diagram of an electronic device according to an embodiment of the present invention.

As shown in FIG. 4, an embodiment of the present invention provides an electronic device 4 configured to execute the DPI adaptation method shown in FIG. 1 or FIG. 2A and FIG. 2B. At least one application is installed on the electronic device 4, and the electronic device 4 includes: an obtaining unit 41, configured to obtain dots per inch DPI of the electronic device 4 and DPI supported by the application, where the DPI of the electronic device 4 includes at least one of logical DPI of the electronic device 4 or physical DPI of the electronic device 4; a first determining unit 42, configured to determine a general display type of the electronic device 4, where the general display type is a most-used display type of the electronic device 4; a second determining unit 43, configured to determine target DPI according to the DPI of the electronic device 4, the DPI supported by the application, and the general display type; and a display unit 44, configured to display a user interface of the application by using the target DPI.

Optionally, the obtaining unit 41 is specifically configured to: obtain, from an installation package of the application, the DPI supported by the application; or obtain, from a preset DPI list, the DPI supported by the application.

Optionally, the second determining unit 43 is specifically configured to: determine, according to the DPI of the electronic device 4, the DPI supported by the application, and a quantity of display types of the electronic device 4, to-be-selected DPI supported by the application; and determine, according to a display type of the electronic device 4 and the to-be-selected DPI supported by the application, target DPI corresponding to the general display type.

Optionally, the second determining unit 43 is specifically configured to: determine a correspondence between the display type of the electronic device 4 and the to-be-selected DPI supported by the application; and determine, according to the correspondence, the target DPI corresponding to the general display type.

Figure 5:
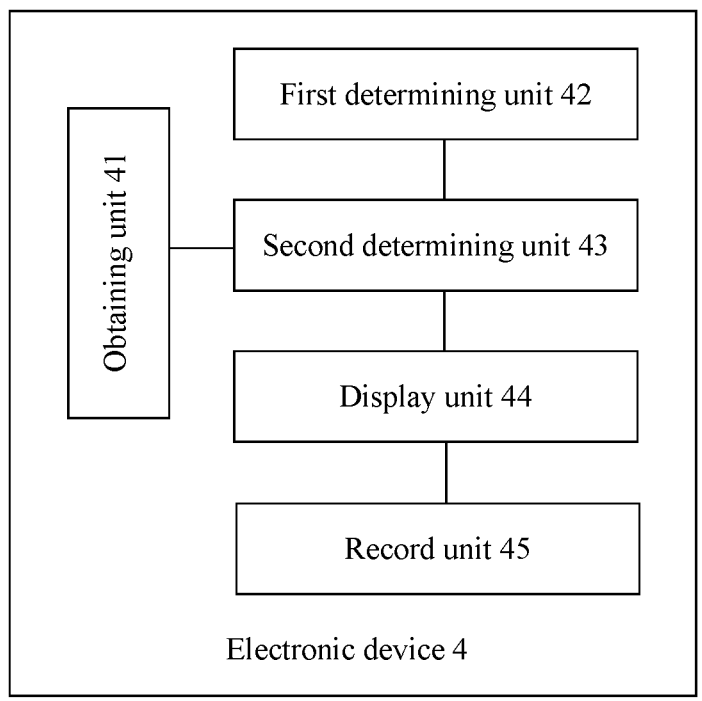
FIG. 5 is a schematic structural diagram of another electronic device according to an embodiment of the present invention.

Optionally, as shown in FIG. 5, the electronic device 44 further includes: a record unit 45, configured to record the target DPI.

Optionally, the first determining unit 42 is specifically configured to determine the general display type of the electronic device 4 according to a historical display-type usage record stored in the electronic device 4.

It should be noted that, for a related explanation in this embodiment, reference may be made to the foregoing method embodiment, and details are not described here again.

According to the electronic device provided in this embodiment of the present invention, target DPI is obtained according to DPI of the electronic device, DPI supported by an application, and a general display type of the electronic device, and a user interface of the application is displayed by using the target DPI, thereby implementing automatic DPI adaptation. On one hand, a parameter being the DPI supported by the application is considered in this solution, so that the electronic device no longer uses only logical DPI to display the user interface of the application. On the other hand, in comparison with the prior art in which DPI adaptation is performed in a user-defined adaptation mode, user experience can be enhanced.

Figure 6:
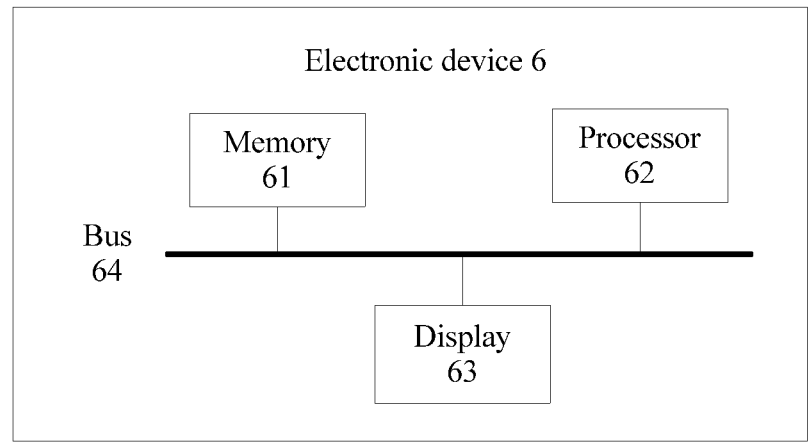
FIG. 6 is a schematic structural diagram of another electronic device according to an embodiment of the present invention.

As shown in FIG. 6, an embodiment of the present invention provides an electronic device 6 configured to execute the DPI adaptation method shown in FIG. 1 or FIG. 2A and FIG. 2B. At least one application is installed on the electronic device 6, and the electronic device 6 includes: a memory 61, a processor 62, a display 63, and a bus 64. The memory 61, the processor 62, and the display 63 are connected by using the bus 64 to perform mutual communication.

The memory 61 is configured to store executable code, and the executable code includes a computer operation instruction. The memory may include a high-speed RAM memory, and may further include a non-volatile memory, for example, at least one disk memory.

The processor 62 may be a central processing unit (CPU), or may be an application-specific integrated circuit (ASIC), or may be configured as one or more integrated circuits that implement this embodiment of the present invention.

The bus 64 may be an Industry Standard Architecture (Industry Standard Architecture, ISA) bus, a Peripheral Component Interconnect (PCI) bus, an Extended Industry Standard Architecture (EISA) bus, or the like. The bus may be classified into an address bus, a data bus, a control bus, and the like. For ease of representation, only one bold line is used in FIG. 6 for representation, but it does not indicate that there is only one bus or one type of bus.

The memory 61 is configured to store a group of executable code, and the executable code is used to control the processor 62 to execute the following actions: obtaining dots per inch DPI of the electronic device 6 and DPI supported by the application, where the DPI of the electronic device 6 includes at least one of logical DPI of the electronic device 6 or physical DPI of the electronic device 6; determining a general display type of the electronic device 6, where the general display type is a most-used display type of the electronic device 6; and determining target DPI according to the DPI of the electronic device 6, the DPI supported by the application, and the general display type.

The display 63 is configured to display a user interface of the application by using the target DPI.

Optionally, the processor 62 is specifically configured to: obtain, from an installation package of the application, the DPI supported by the application; or obtain, from a preset DPI list, the DPI supported by the application.

Optionally, the processor 62 is specifically configured to: determine, according to the DPI of the electronic device 6, the DPI supported by the application, and a quantity of display types of the electronic device 6, to-be-selected DPI supported by the application; and determine, according to a display type of the electronic device 6 and the to-be-selected DPI supported by the application, target DPI corresponding to the general display type.

Optionally, the processor 62 is specifically configured to: determine a correspondence between the display type of the electronic device 6 and the to-be-selected DPI supported by the application; and determine, according to the correspondence, the target DPI corresponding to the general display type.

Optionally, the memory 61 is further configured to record the target DPI.

Optionally, the processor 62 is specifically configured to determine the general display type of the electronic device 6 according to a historical display-type usage record stored in the electronic device 6.

It should be noted that, for a related explanation in this embodiment, reference may be made to the foregoing method embodiment, and details are not described here again.

According to the electronic device provided in this embodiment of the present invention, target DPI is obtained according to DPI of the electronic device, DPI supported by an application, and a general display type of the electronic device, and a user interface of the application is displayed by using the target DPI, thereby implementing automatic DPI adaptation. On one hand, a parameter being the DPI supported by the application is considered in this solution, so that the electronic device no longer uses only logical DPI to display the user interface of the application. On the other hand, in comparison with the prior art in which DPI adaptation is performed in a user-defined adaptation mode, user experience can be enhanced.

Figure 7:
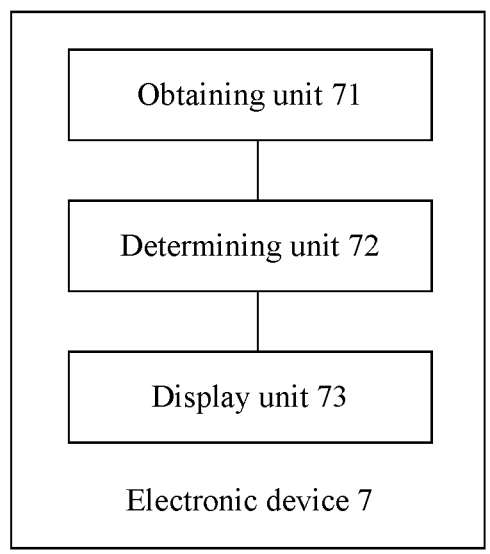
FIG. 7 is a schematic structural diagram of another electronic device according to an embodiment of the present invention.

As shown in FIG. 7, an embodiment of the present invention provides an electronic device 7 configured to execute the DPI adaptation method shown in FIG. 3. At least one application is installed on the electronic device 7, and the electronic device 7 includes: an obtaining unit 71, configured to obtain a whitelist, where the whitelist includes a correspondence between a specific application identifier and dots per inch DPI; a determining unit 72, configured to use DPI corresponding to an identifier of the application as target DPI if the whitelist includes the identifier of the application, or use logical DPI of the electronic device as target DPI if the whitelist does not include an identifier of the application; and a display unit 73, configured to display a user interface of the application by using the target DPI.

It should be noted that, for a related explanation in this embodiment, reference may be made to the foregoing method embodiment, and details are not described here again.

According to the electronic device provided in this embodiment of the present invention, target DPI is obtained by determining whether an application is included in a whitelist, and a user interface of the application is displayed by using the target DPI, thereby implementing automatic DPI adaptation. In comparison with the prior art in which DPI adaptation is performed in a user-defined adaptation mode, user experience can be enhanced.

Figure 8:
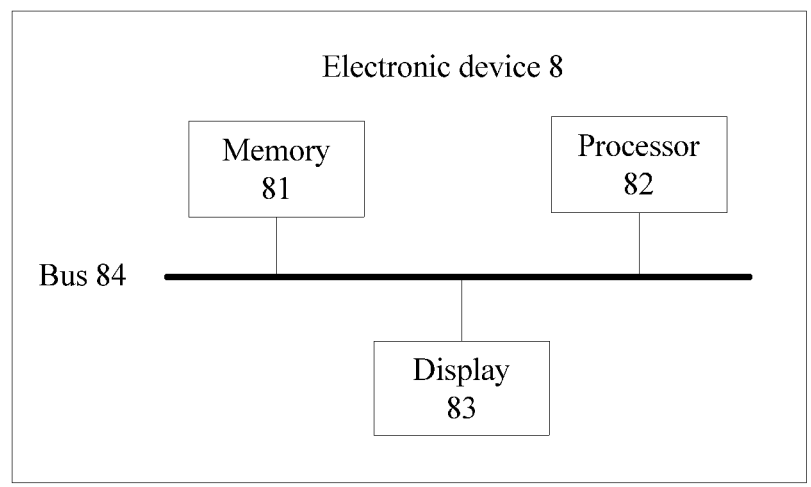
FIG. 8 is a schematic structural diagram of another electronic device according to an embodiment of the present invention.

As shown in FIG. 8, an embodiment of the present invention provides an electronic device 8 configured to execute the DPI adaptation method shown in FIG. 3. At least one application is installed on the electronic device 8, and the electronic device 8 includes: a memory 81, a processor 82, a display 83, and a bus 84. The memory 81, the processor 82, and the display 83 are connected by using the bus 84 to perform mutual communication.

The memory 81 is configured to store a group of executable code, and the executable code is used to control the processor 82 to execute the following actions: obtaining a whitelist, where the whitelist includes a correspondence between a specific application identifier and dots per inch DPI; and using DPI corresponding to an identifier of the application as target DPI if the whitelist includes the identifier of the application, or using logical DPI of the electronic device as target DPI if the whitelist does not include an identifier of the application.

The display 83 is configured to display a user interface of the application by using the target DPI.

It should be noted that, for a related explanation in this embodiment, reference may be made to the foregoing method embodiment, and details are not described here again. For a related explanation of the memory, the executable code, the processor, the bus, and the like, reference may be made to the foregoing apparatus embodiment, and details are not described here again.

According to the electronic device provided in this embodiment of the present invention, target DPI is obtained by determining whether an application is included in a whitelist, and a user interface of the application is displayed by using the target DPI, thereby implementing automatic DPI adaptation. In comparison with the prior art in which DPI adaptation is performed in a user-defined adaptation mode, user experience can be enhanced.

In the several embodiments provided in the present application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of the present invention. The foregoing storage medium includes: any medium that can store program code, such as a USB flash drive, a removable hard disk, a ROM, a RAM (Random Access Memory), a magnetic disk, or an optical disc.

What is claimed is:

1. A dots per inch (DPI) adaptation method, comprising:
   obtaining DPI of an electronic device and DPI supported by an application, wherein the application is installed on the electronic device, and wherein the DPI of the electronic device comprises logical DPI of the electronic device or physical DPI of the electronic device;
   determining a general display type of the electronic device, wherein the general display type is a most-used display type of the electronic device, and the most-used display type of the electronic device is determined according to historical usage data of the electronic device;

determining a target DPI according to the DPI of the electronic device, the DPI supported by the application, and the general display type; and displaying a user interface of the application by using the target DPI.

2. The method according to claim 1, wherein obtaining the DPI supported by the application comprises one of:
obtaining, from an installation package of the application, the DPI supported by the application; and
obtaining, from a preset DPI list, the DPI supported by the application.

3. The method according to claim 2, wherein after determining the target DPI, the method further comprises:
recording the target DPI.

4. The method according to claim 2, wherein the historical usage data of the electronic device comprises a historical display-type usage record stored in the electronic device.

5. The method according to claim 1, wherein determining the target DPI according to the DPI of the electronic device, the DPI supported by the application, and the general display type comprises:
determining, according to the DPI of the electronic device, the DPI supported by the application, and a quantity of display types of the electronic device, to-be-selected DPI supported by the application; and
determining, according to a first display type of the electronic device and the to-be-selected DPI supported by the application, the target DPI corresponding to the general display type.

6. The method according to claim 5, wherein determining the target DPI corresponding to the general display type comprises:
determining a correspondence between the first display type of the electronic device and the to-be-selected DPI supported by the application; and
determining, according to the correspondence, the target DPI corresponding to the general display type.

7. The method according to claim 1, wherein after determining the target DPI, the method further comprises:
recording the target DPI.

8. The method according to claim 1, wherein the historical usage data of the electronic device comprises a historical display-type usage record stored in the electronic device.

9. An electronic device, comprising:
a memory;
a processor; and
a display;
wherein an application is installed on the electronic device; and
wherein the memory is configured to store a group of executable code, and the executable code is used to control the processor to execute the following:
obtaining dots per inch (DPI) of the electronic device and DPI supported by the application, wherein the DPI of the electronic device comprises logical DPI of the electronic device or physical DPI of the electronic device;
determining a general display type of the electronic device, wherein the general display type is a most-used display type of the electronic device, and the most-used display type of the electronic device is determined according to historical usage data of the electronic device; and
determining a target DPI according to the DPI of the electronic device, the DPI supported by the application, and the general display type; and wherein the display is configured to display a user interface of the application using the target DPI.

10. The electronic device according to claim 9, wherein the processor is configured to perform one of:
obtaining, from an installation package of the application, the DPI supported by the application; and
obtaining, from a preset DPI list, the DPI supported by the application.

11. The electronic device according to claim 10, wherein the memory is further configured to record the target DPI.

12. The electronic device according to claim 10, wherein the historical usage data of the electronic device comprises a historical display-type usage record stored in the electronic device.

13. The electronic device according to claim 9, wherein the processor is configured to:
determine, according to the DPI of the electronic device, the DPI supported by the application, and a quantity of display types of the electronic device, to-be-selected DPI supported by the application; and
determine, according to a first display type of the electronic device and the to-be-selected DPI supported by the application, target DPI corresponding to the general display type.

14. The electronic device according to claim 13, wherein the processor is configured to:
determine a correspondence between the first display type of the electronic device and the to-be-selected DPI supported by the application; and
determine, according to the correspondence, the target DPI corresponding to the general display type.

15. The electronic device according to claim 9, wherein:
the memory is further configured to record the target DPI.

16. The electronic device according to claim 9, wherein the historical usage data of the electronic device comprises a historical display-type usage record stored in the electronic device.

17. An electronic device, comprising:
a memory;
a processor; and
a display;
wherein an application is installed on the electronic device; and
wherein the memory is configured to store a group of executable code, and the executable code is used to control the processor to execute the following:
obtaining a whitelist, wherein the whitelist comprises a correspondence between a specific application identifier and dots per inch (DPI), and wherein the whitelist is stored in the memory; and
using DPI corresponding to an identifier of the application as target DPI when the whitelist comprises the identifier of the application, and using logical DPI of the electronic device as target DPI when the whitelist does not comprise the identifier of the application; and
wherein the display is configured to display a user interface of the application by using the target DPI.

18. The electronic device according to claim 17, wherein the whitelist is set by a manufacturer of the electronic device.

19. The electronic device according to claim 17, wherein the DPI corresponding to the identifier of the application is logical DPI.

* * * * *